(12) United States Patent
Takenaka et al.

(10) Patent No.: US 8,379,160 B2
(45) Date of Patent: Feb. 19, 2013

(54) APPARATUS CONCEALING MEMBER, APPARATUS USING THE SAME, AND METHOD FOR CONCEALING PORTION TO BE CONCEALED OF APPARATUS

(75) Inventors: Hiroshi Takenaka, Kyoto (JP); Kazuto Nakamura, Kyoto (JP); Takeshi Nishimura, Kyoto (JP); Yosuke Sagayama, Kyoto (JP); Hiroyuki Hoshino, Kyoto (JP)

(73) Assignee: Nissha Printing Co., Ltd., Kyoto (JP)

( * ) Notice: Subject to any disclaimer, the term of this patent is extended or adjusted under 35 U.S.C. 154(b) by 0 days.

(21) Appl. No.: 13/259,419

(22) PCT Filed: Mar. 25, 2010

(86) PCT No.: PCT/JP2010/055167
§ 371 (c)(1),
(2), (4) Date: Sep. 23, 2011

(87) PCT Pub. No.: WO2010/113739
PCT Pub. Date: Oct. 7, 2010

(65) Prior Publication Data
US 2012/0026419 A1    Feb. 2, 2012

(30) Foreign Application Priority Data
Mar. 31, 2009  (JP) .................................. 2009-085241

(51) Int. Cl.
*G02F 1/133*    (2006.01)
(52) U.S. Cl. .......................................... 349/33; 349/122
(58) Field of Classification Search .................. None
See application file for complete search history.

(56) References Cited

U.S. PATENT DOCUMENTS

| | | | | |
|---|---|---|---|---|
| 5,617,228 | A | * | 4/1997 | Watanabe et al. ................ 349/19 |
| 5,759,643 | A | * | 6/1998 | Miyashita et al. ........... 428/1.31 |
| 5,774,107 | A | * | 6/1998 | Inou .............................. 345/104 |
| 6,185,161 | B1 | | 2/2001 | Arikawa et al. |
| 8,018,645 | B2 | | 9/2011 | Omote et al. |
| 8,184,259 | B2 | | 5/2012 | Omote et al. |

(Continued)

FOREIGN PATENT DOCUMENTS

| | | |
|---|---|---|
| JP | 2001-290135 | 10/2001 |
| JP | 2003-122260 | 4/2003 |

(Continued)

OTHER PUBLICATIONS

International Search Report issued Apr. 27, 2010 in International (PCT) Application No. PCT/JP2010/055167.

(Continued)

*Primary Examiner* — Lucy Chien
(74) *Attorney, Agent, or Firm* — Wenderoth, Lind & Ponack, LLP

(57) ABSTRACT

An apparatus concealing member in which a film-type information input device (4) is placed under a film-type transparent base member (3), a functional liquid crystal film (5) is placed under the information input device (4) at a position where the functional liquid crystal film (5) covers a portion to be concealed (1b) of an apparatus and can be electrically changed over between being transparent and being non-transparent, and a non-metal and film-type glossy layer (6) is placed under the functional liquid crystal film and exhibits transparency and a gloss due to reflection.

6 Claims, 9 Drawing Sheets

U.S. PATENT DOCUMENTS

2001/0002145 A1* 5/2001 Lee et al. .................... 349/58
2001/0022632 A1   9/2001 Umemoto et al.
2009/0009486 A1   1/2009 Sato et al.
2011/0211135 A1* 9/2011 Sharp et al. .................. 349/15

FOREIGN PATENT DOCUMENTS

JP   2003-140149   5/2003
WO   2009/008402   1/2009

OTHER PUBLICATIONS

Patent Cooperation Treaty (PCT) International Preliminary Report on Patentability issued Nov. 15, 2011 in International (PCT) Application No. PCT/JP2010/055167.

Extended European Search Report (in English language) issued Oct. 4, 2012 in corresponding European Patent Application No. 10 75 8512.

* cited by examiner

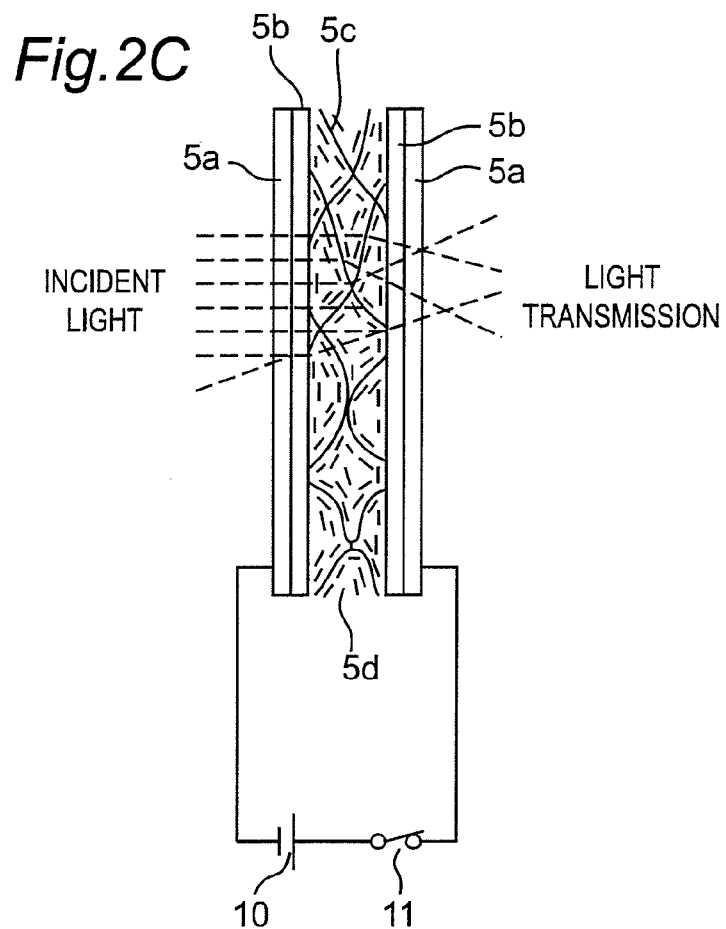
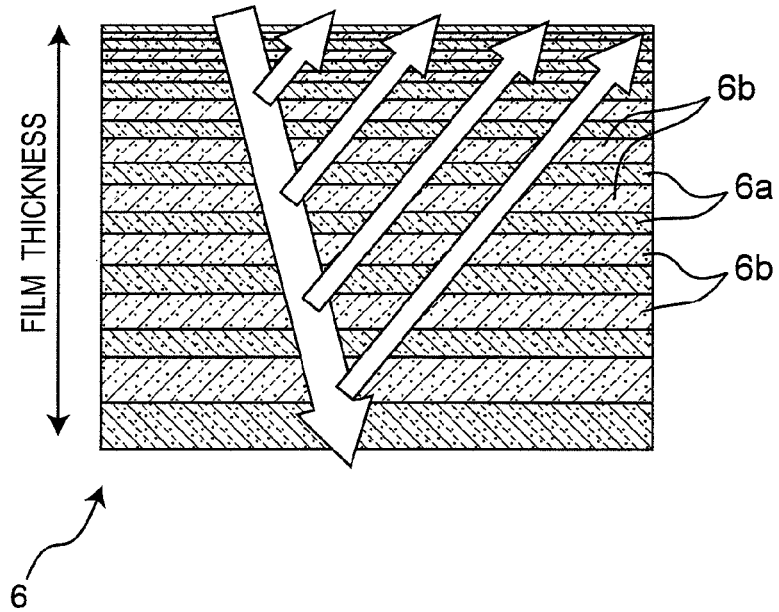

APPARATUS CONCEALING MEMBER, APPARATUS USING THE SAME, AND METHOD FOR CONCEALING PORTION TO BE CONCEALED OF APPARATUS

BACKGROUND OF THE INVENTION

1. Technical Field

The present invention relates to an apparatus concealing member which can be mounted to a portion to be concealed, such as a display unit of an apparatus, to add, thereto, a specific design capable of concealing the portion to be concealed in a concealment mode while manifesting the portion to be concealed in a non-concealment mode and, further, relates to an apparatus employing the same and a method for concealing a portion to be concealed of an apparatus.

2. Description of the Related Art

Electronic apparatuses including small-sized display devices, such as cellular phones and portable information terminals (PDAs) such as electronic notebooks, are provided with flat panel displays, such as liquid crystal displays, organic EL displays, field-emission type displays, or plasma displays, as display devices.

Further, in order to protect the display surfaces of such displays, protective plates made of plastic, glass, and the like have been attached to the casings of the electronic apparatuses for preventing the display surfaces of these displays from being exposed.

Such protective plates have been further for the sake of providing designs to the electronic apparatuses, as well as protecting the display surfaces of the displays. Particularly, in recent years, there has been a need for electronic apparatuses provided with unique designs for differentiating them from other products, and there has been a need for providing particular designs to entire displays without degrading the displaying performance of the displays.

SUMMARY OF THE INVENTION

1. Subject to be Solved by the Invention

In order to address these needs, the present inventors have created designs capable of exerting excellent effects of exhibiting the same color as that of a casing for completely preventing the area where a display is placed from being perceived when the display is not driven (at a non-display state) and, also, manifesting the area where the display is placed for causing it to be clearly distinguished from the casing when the display is driven (at a display state).

As a structure for exerting such effects which are excellent in design, use of conventionally-known functional liquid crystal films is conceived, but it is hard to provide sufficient concealment only by placing a functional liquid crystal film on the outer side of a display, which causes the casing and the area where the display is placed to be visually recognized even at non-driven states, thereby making it impossible to exert the aforementioned effects which are excellent in design. If an attempt is made to provide sufficient concealment with conventional functional liquid crystal films, it is necessary to increase the thicknesses of the functional liquid crystal films for enhancing the concealing ability, which makes it hard to apply them to small-sized apparatuses or home electric appliances and the like.

Further, it is also possible to place a half-mirror layer formed by metal vapor deposition in the area where a display is placed, while making the casing to exhibit a metal color. However, with this method, the metal will induce radio-wave disturbances and the like, which makes it hard to realize combinations thereof with touch sensors, combinations thereof with PCs (personal computers) or with communication apparatuses such as cellular phones.

Therefore, in order to overcome the aforementioned issues, it is an object of the present invention to provide an apparatus concealing member, an apparatus employing the same, and a method for concealing a portion to be concealed of an apparatus which are capable of augmenting the concealing ability of functional liquid crystal films and, also, realizing a necessary concealing ability for designs of various types of products without inducing radio-wave disturbances and the like.

2. Means for Solving the Subject

In order to attain the aforementioned object, there are provided the following structures, according to the present invention.

According to a first aspect of the present invention, there is provided an apparatus concealing member which is mountable to a casing of an apparatus so as to cover a portion to be concealed of the apparatus and is capable of concealing the portion to be concealed of the apparatus in a concealment mode while manifesting the portion to be concealed in a non-concealment mode, the apparatus concealing member comprising:

a film-type information input device;

a functional liquid crystal film which is placed under the information input device, also can be placed at a position where the functional liquid crystal film covers the portion to be concealed of the apparatus and can be electrically changed over between being transparent and being non-transparent; and a film-type non-metal glossy layer which is placed under the functional liquid crystal film and, also, exhibits transparency and a gloss due to reflection;

wherein the information input device, the functional liquid crystal film, and the glossy layer are laminated in the mentioned order.

According to a second aspect of the present invention, there is provided the apparatus concealing member according to the first aspect, wherein a color exhibited by the functional liquid crystal film at an electrically-nontransparent state, the glossy layer, and the portion to be concealed when viewed from outside of the apparatus through the information input device is conformed to a color of the casing to which the apparatus concealing member is mounted.

According to a third aspect of the present invention, there is provided the apparatus concealing member according to the first aspect, further comprising a film-type transparent base member placed on the information input device, and a concealing layer for concealing wiring of the information input device, which is placed on an inner surface of the transparent base member at a periphery of the information input device, wherein a color exhibited by the functional liquid crystal film at an electrically-nontransparent state, the glossy layer, and the portion to be concealed when viewed from outside of the apparatus through the transparent base member is conformed to a color of the concealing layer and a color of the casing to which the apparatus concealing member is mounted.

According to a fourth aspect of the present invention, there is provided the apparatus concealing member according to any one of the first to third aspects, wherein the functional liquid crystal film is formed from a polymer-dispersed type liquid crystal film and is structured to be changed over between a light-transparent state and a non-transparent state where light does not pass therethrough by application of a voltage thereto.

According to a fifth aspect of the present invention, there is provided an apparatus comprising:

the apparatus concealing member according to any one of the first to third aspects, mounted to the casing of the apparatus;

a state detection unit adapted to detect the usage state of the apparatus;

a functional-liquid-crystal-film voltage application unit adapted to apply a voltage to the functional liquid crystal film in the apparatus concealing member; and a control unit adapted to control the functional-liquid-crystal-film voltage application unit, such that the functional-liquid-crystal-film voltage application unit applies the voltage to the functional liquid crystal film when the state detection unit detects the usage state of the apparatus and, also, such that the functional-liquid-crystal-film voltage application unit does not apply the voltage to the functional liquid crystal film when the state detection unit does not detect the usage state of the apparatus.

According to a sixth aspect of the present invention, there is provided the apparatus according to the fifth aspect, wherein the portion to be concealed is a display unit in the apparatus.

According to a seventh aspect of the present invention, there is provided an apparatus comprising:

the apparatus concealing member according to the fourth aspect, mounted to the casing of the apparatus;

a state detection unit adapted to detect the usage state of the apparatus;

a functional-liquid-crystal-film voltage application unit adapted to apply a voltage to the functional liquid crystal film in the apparatus concealing member; and a control unit adapted to control the functional-liquid-crystal-film voltage application unit, such that the functional-liquid-crystal-film voltage application unit applies the voltage to the functional liquid crystal film when the state detection unit detects the usage state of the apparatus and, also, such that the functional-liquid-crystal-film voltage application unit does not apply the voltage to the functional liquid crystal film when the state detection unit does not detect the usage state of the apparatus.

According to an eighth aspect of the present invention, there is provided the apparatus according to the seventh aspect, wherein the portion to be concealed is a display unit in the apparatus.

According to a ninth aspect of the present invention, there is provided a method for concealing an apparatus, the apparatus comprising:

the apparatus concealing member according to any one of the first to third aspects, mounted to the casing of the apparatus;

a state detection unit adapted to detect the usage state of the apparatus;

a functional-liquid-crystal-film voltage application unit adapted to apply a voltage to the functional liquid crystal film in the apparatus concealing member; and a control unit adapted to control the functional-liquid-crystal-film voltage application unit, such that the functional-liquid-crystal-film voltage application unit applies the voltage to the functional liquid crystal film when the state detection unit detects the usage state of the apparatus and, also, such that the functional-liquid-crystal-film voltage application unit does not apply the voltage to the functional liquid crystal film when the state detection unit does not detect the usage state of the apparatus. The method comprises:

detecting the usage state of the apparatus by the state detection unit;

controlling the functional-liquid-crystal-film voltage application unit by the control unit such that the functional-liquid-crystal film voltage application unit applies a voltage to the functional liquid crystal film in the apparatus concealing member for changing over the functional liquid crystal film from a non-transparent state to a transparent state for manifesting the portion to be concealed, when the usage state of the apparatus is detected by the state detection unit; and controlling the functional-liquid-crystal-film voltage application unit by the control unit such that the functional-liquid-crystal film voltage application unit does not apply the voltage to the functional liquid crystal film in the apparatus concealing member for changing over the functional liquid crystal film from the transparent state to the non-transparent state for concealing the portion to be concealed, when the usage state of the apparatus is not detected by the state detection unit.

According to a tenth aspect of the present invention, there is provided a method for concealing an apparatus. The apparatus comprises:

the apparatus concealing member according to the fourth aspect, mounted to the casing of the apparatus;

a state detection unit adapted to detect the usage state of the apparatus;

a functional-liquid-crystal-film voltage application unit adapted to apply a voltage to the functional liquid crystal film in the apparatus concealing member; and a control unit adapted to control the functional-liquid-crystal-film voltage application unit, such that the functional-liquid-crystal-film voltage application unit applies the voltage to the functional liquid crystal film when the state detection unit detects the usage state of the apparatus and, also, such that the functional-liquid-crystal-film voltage application unit does not apply the voltage to the functional liquid crystal film when the state detection unit does not detect the usage state of the apparatus.

The method comprises:

detecting the usage state of the apparatus by the state detection unit;

controlling the functional-liquid-crystal-film voltage application unit by the control unit such that the functional-liquid-crystal film voltage application unit applies a voltage to the functional liquid crystal film in the apparatus concealing member for changing over the functional liquid crystal film from a non-transparent state to a transparent state for manifesting the portion to be concealed, when the usage state of the apparatus is detected by the state detection unit; and controlling the functional-liquid-crystal-film voltage application unit by the control unit such that the functional-liquid-crystal film voltage application unit does not apply the voltage to the functional liquid crystal film in the apparatus concealing member for changing over the functional liquid crystal film from the transparent state to the non-transparent state for concealing the portion to be concealed, when the usage state of the apparatus is not detected by the state detection unit.

3. Effects of the Invention

According to the present invention, the glossy layer is placed on the functional liquid crystal film near the portion to be concealed and, therefore, the glossy layer can enhance the concealing ability, which has been insufficiently provided by only the functional liquid crystal film. This can augment the concealing ability of the functional liquid crystal film. Further, by forming the glossy layer from a non-metal, it is possible to prevent the occurrence of radio-wave disturbances and the like. This enables provision of the apparatus concealing member capable of realizing a necessary concealing ability for designs of various types of products without inducing radio-wave disturbances and the like, the apparatus employing the same, and the method for concealing a portion to be concealed of an apparatus.

Further, by conforming the color exhibited by the functional liquid crystal film at the electrically-nontransparent state, the glossy layer, and the portion to be concealed when they are viewed from the outside of the apparatus to the color of the casing to which the apparatus concealing member is mounted (by matching the colors of them), when the apparatus is not used, and the functional liquid crystal film is at a non-transparent state, the portion to be concealed is integrated with the casing, which makes it impossible to distinguish therebetween, thereby realizing a design capable of substantially eliminating the existence of the portion to be concealed itself (in other words, substantially-completely concealing the portion to be concealed). On the other hand, when the apparatus is used, and the functional liquid crystal film is at a transparent state, the portion to be concealed can be made to be clearly distinguished from the casing, thereby improving the viewability of the portion to be concealed. Accordingly, it is possible to cause a transition from a state where the portion to be concealed is substantially-completely concealed to prevent the existence of the portion to be concealed itself from being perceived to a state where the portion to be concealed is manifested, which can provide an impressive design with surprising and unpredictable quality of a type for users.

BRIEF DESCRIPTION OF THE DRAWINGS

These and other aspects and features of the present invention will become clear from the following description taken in conjunction with the preferred embodiments thereof with reference to the accompanying drawings, in which:

FIG. 2C is a cross-sectional view of the PN-type liquid crystal display device in the apparatus concealing film according to the embodiment at a state where the switch is off and no voltage is applied from the power supply to the transparent electrode substrates, so that the liquid crystal molecules are aligned along the surfaces of the polymer network, and the liquid crystal molecules are not coincident with the polymer network in refractive index, thereby causing a light-scattering state (non-transparent state);

FIG. 3 is a cross-sectional view for illustrating the schematic structure and the effects of a nano laminated-layer PET film as an example of a glossy layer in the apparatus concealing film according to the embodiment;

DETAILED DESCRIPTION OF THE INVENTION

Hereinafter, a first embodiment of the present invention will be described, in detail, with reference to the drawings.

Figure 1A:
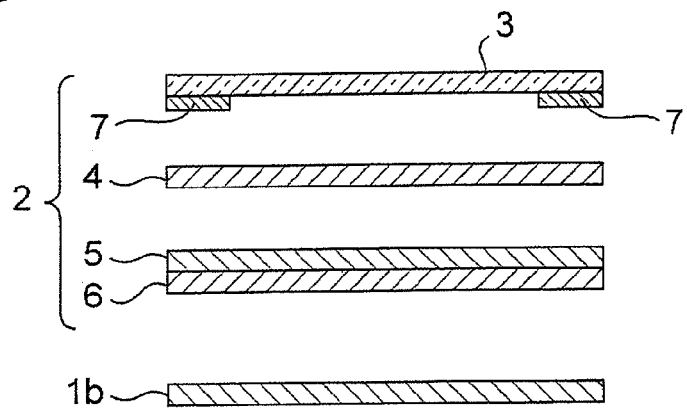
FIG. 1A is a cross-sectional view of an apparatus concealing film according to one embodiment of the present invention at a state where the film is disassembled.
Figure 1B:
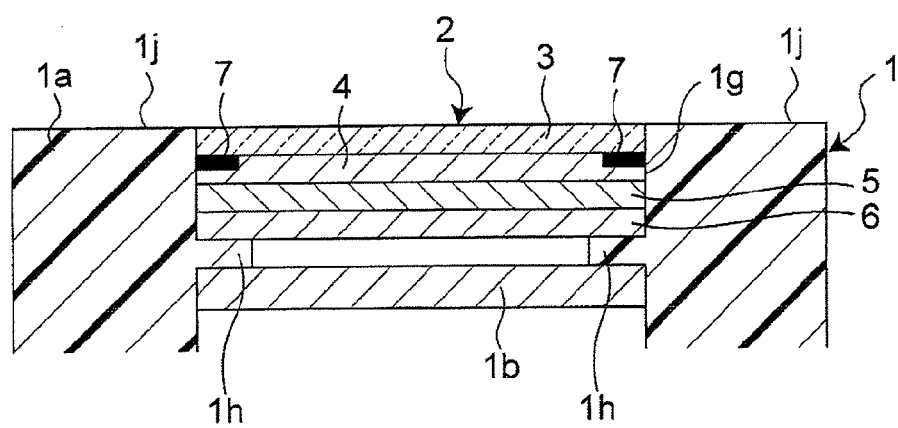
FIG. 1B is a cross-sectional view of the apparatus concealing film at a state where the film is mounted to a casing of an apparatus, according to the embodiment.

FIG. 1A illustrates a cross-sectional view of an apparatus concealing film 2 as an example of an apparatus concealing member according to one embodiment of the present invention at a state where the film 2 is disassembled, and FIG. 1B illustrates a cross-sectional view of the apparatus concealing film 2 at a state where the film 2 is mounted to a casing 1a of an apparatus 1.

Figure 1C:
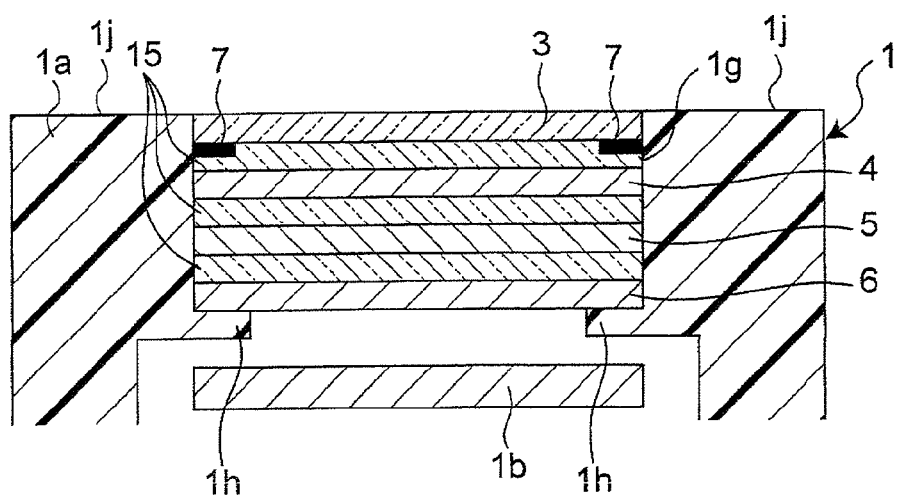
FIG. 1C is a cross-sectional view of the apparatus concealing film at a state where the film is mounted to the casing of the apparatus, according to the embodiment, clearly illustrating adhesive layers therein.

In FIG. 1A and FIG. 1B, there is the apparatus concealing film 2 which can be mounted in a concave portion 1g of the casing 1a of the apparatus 1 and is adapted to conceal a portion to be concealed (for example, an operation unit, such as a display unit) 1b of the apparatus 1 for making the area 1c where the display unit 1b exists unclear (see FIG. 5A) when the apparatus 1 is not used, and to manifest the area 1c where the display unit 1 exists when the apparatus 1 is used. Namely, the apparatus concealing film 2 can be mounted in the concave portion 1g of the casing 1a of the apparatus 1, so as to cover the portion to be concealed (for example, an operation unit such as the display unit) 1b of the apparatus 1. This film 2 is structured by laminating, in order, a film-type transparent base member 3, a film-type information input device, such as a touch sensor 4, which is placed under the transparent base member 3, a functional liquid crystal film 5 which is placed under the touch sensor 4, also can be placed at a position where the functional liquid crystal film can cover the display unit 1b of the apparatus 1 and, also, can be electrically changed over between being transparent and being non-transparent, and a film-type glossy layer 6 which is placed under the functional liquid crystal film 5 and also exhibits transparency and a gloss due to reflection. As illustrated in FIG. 1C, the connection between the respective layers can be made such that adhesive layers 15 made of a transparent adhesive agent are used for connecting them to one another. Namely, as illustrated in FIG. 1C, an adhesive layer 15 is placed over the entire surface between the transparent base member 3 and the touch sensor 4, an adhesive layer 15 is placed over the entire surface between the touch sensor 4 and the functional liquid crystal film 5, and an adhesive layer 15 is placed over the entire surface between the functional liquid crystal film 5 and the glossy layer 6.

The transparent base member 3, which is placed as the outermost layer of the apparatus concealing film 2, is a film-type or thin-plate-type member which exhibits excellent transparency and also can protect the display unit 1b against fractures. The transparent base member 3 can be provided, at its surface, with arbitrary patterns, in such a way as not to degrade the viewability of the display unit 1b. The transparent base member 3 is made of a synthetic resin, a toughened glass, or the like. As the synthetic resin, it is possible to employ, for example, a general-purpose resin, such as a polystyrene-based resin, a polyolefin-based resin, an ABS resin, an AS resin, an acrylic-based resin, or an AN resin. Further, as other examples of the synthetic resin, it is also possible to employ general-purpose engineering resins, such as polyphenylene-oxide-polystyrene-based resin, polycarbonate-based resins, polyacetal-based resins, polycarbonate-modified polyphenylene ether resins, polybutylene-terephthalate resins, or ultra high molecular weight polyethylene resins. Further, it is also possible to employ super engineering resins, such as polysulfone resins, polyphenylene-sulfide-based resins, polyphenylene-oxide-based resins, polyarylate resins, polyether imide resins, polyimide resins, liquid crystal polyester resins, or polyallyl-based heat resistant resins. Further, although the transparent base member 3 is a plate-shaped member, this plate shape is not limited to a flat-plate shape as illustrated in the figure and, also, includes a thin-type molding article having a three-dimensional curved surface.

Further, in cases of employing a toughened glass as the transparent base member 3, the material thereof is not particularly limited, but it is preferable to employ, rather than a so-called blue glass for general purposes, a white soda glass (so-called white glass) which is more superior thereto in mechanical strength. The method for fabricating such a toughened glass (the method for toughening) is not particularly limited, but it is preferable to employ a toughening method which utilizes ion exchange, since thick-plate glasses having thicknesses of about 1 mm are generally employed, in many cases. Such a chemically-toughened glass which has been toughened through ion exchange exhibits higher compressive stresses than those of air-cooled toughened glasses.

The thickness of the transparent base member 3 is not particularly limited, but it is preferable to make it to be about 0.3 to 1.1 mm and it is more preferable to make it to be 0.5 to 0.8 mm, in view of maintaining a sufficient strength characteristic while reducing the weight thereof.

On the inner surface of the transparent base member 3, entirely or partially, near the outer periphery thereof, there is formed a sensor-wiring concealing layer 7 provided with a design for concealing the wirings of the touch sensor 4. For example, in cases where the transparent base member 3 has a quadrilateral shape, the sensor-wiring concealing layer 7 is formed to have a quadrilateral-frame shape at the periphery of the inner surface of the transparent base member 3, in order to conceal the wirings provided at the peripheral edge portions of the touch sensor 4. Further, in cases where the wirings of the touch sensor 4 are provided at only three sides of the peripheral edge portions of the rectangular touch sensor 4, it is necessary to conceal only these three sides with the concealing layer 7, which eliminates the necessity of forming the concealing layer 7 on the other one side of the peripheral edge portions. Further, in cases where the wirings of the touch sensor 4 are provided at only a single side of the peripheral edge portions of the rectangular touch sensor 4, it is necessary to conceal only this single side with the concealing layer 7, which eliminates the necessity of forming the concealing layer 7 on the other three sides. The concealing layer 7 can be formed through printing or the like. The apparatus 1 can be decorated by the concealing layer 7.

As illustrated in FIGS. 1A to 1C, the touch sensor 4 is placed on the inner surface of the transparent base member 3 such that its wiring portion at its periphery is overlaid on the sensor-wiring concealing layer 7, which enables inputting information to the apparatus 1 or operating the apparatus 1 by pushing the touch sensor 4 through the transparent base member 3 with fingers and the like. Further, the touch sensor 4 is necessary in portable apparatuses, but may be unnecessary in home electrical appliances in some cases. The touch sensor 4 can be also served as a state detection unit 32 for detecting a state where a user is using the apparatus 1, which will be described later (see FIG. 4).

Figure 2A:
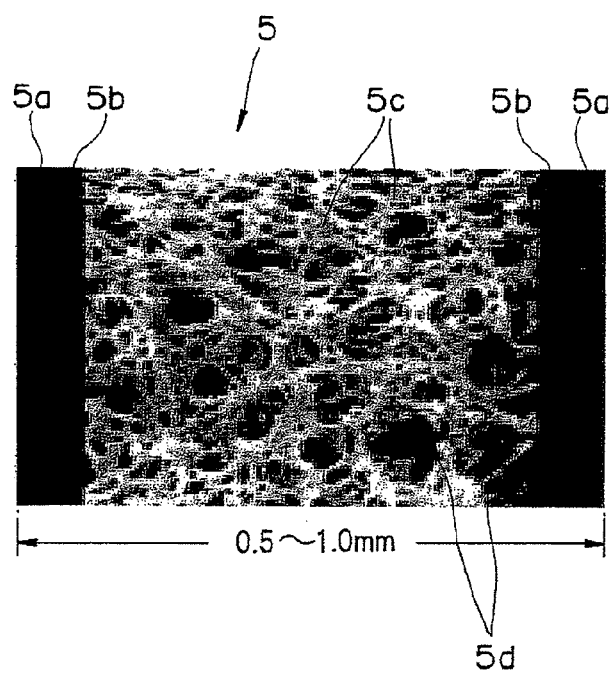
FIG. 2A is an enlarged cross-sectional view of a PN-type liquid crystal display device in the apparatus concealing film according to the embodiment.
Figure 2B:
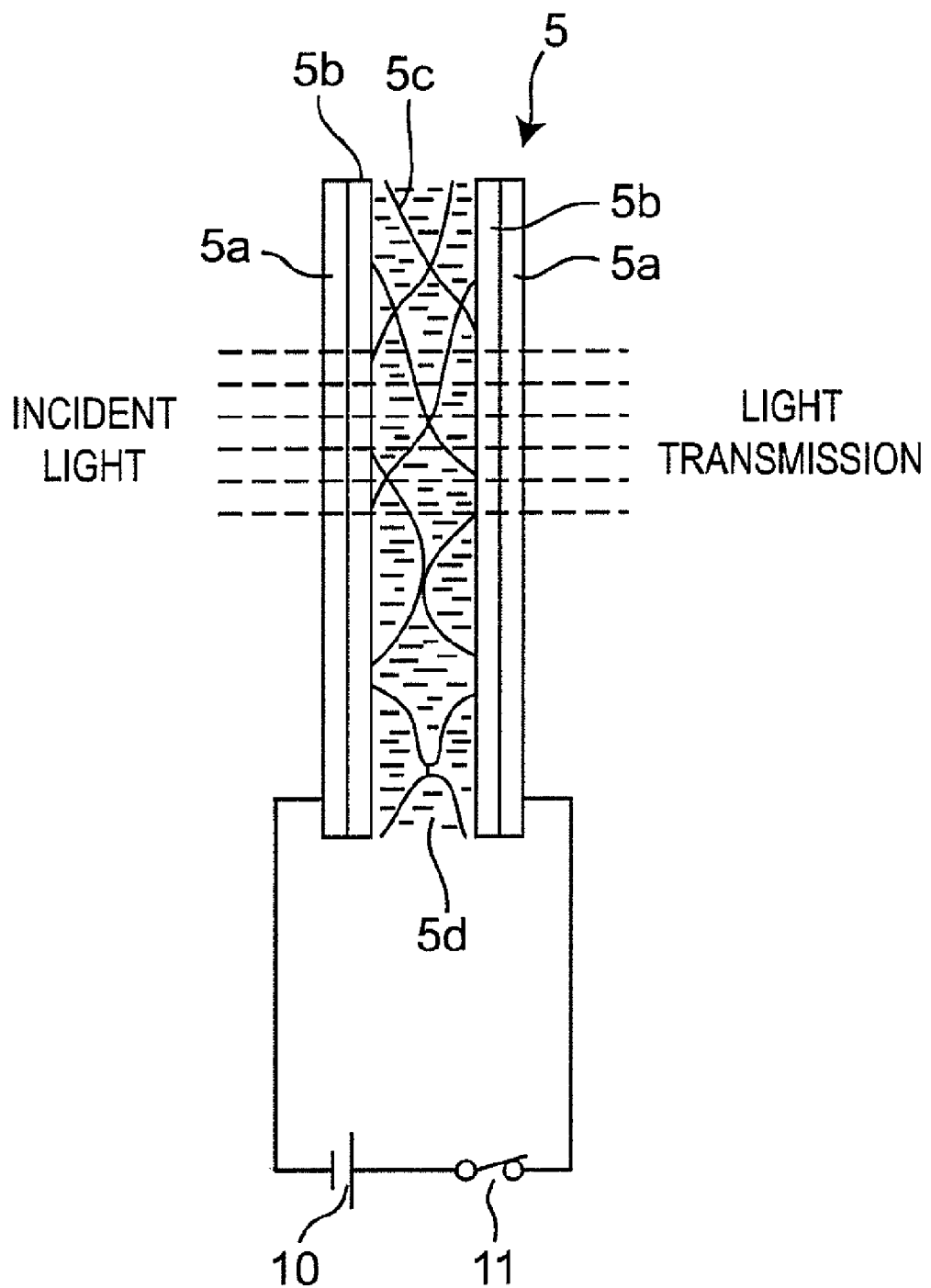
FIG. 2B is a cross-sectional view of the PN-type liquid crystal display device in the apparatus concealing film according to the embodiment at a state where a switch is on and a voltage is applied from a power supply to transparent electrode substrates, so that liquid crystal molecules are oriented in the direction of an electric field, and the liquid crystal molecules are substantially coincident with a polymer network in refractive index, thereby causing a transparent state.

The functional liquid crystal film 5 is placed on the inner surface of the touch sensor 4 and, also, at least outside the display unit 1b. The functional liquid crystal film 5 preferably has at least the same size as that of the area where the display unit 1b is placed. An example of the functional liquid crystal film 5 is a liquid crystal display device of a type in the form called "Polymer Network (PN) type". Such a PN-type liquid crystal display device (PNLCD) is structured to enclose a liquid crystal 5d and a polymer network 5c between a pair of transparent electrode substrates (for example, plastic substrates, such as polyethylene (PET) films) 5a which have respective transparent electrodes 5b at their opposing inner surfaces (the black-colored portions at the opposite sides in FIG. 2A), as illustrated in an enlarged manner in its cross section in FIG. 2A. As illustrated in FIG. 2B, when a switch 11 is on for applying a voltage to the pair of the transparent electrode substrates 5a from a power supply 10, the liquid crystal molecules are oriented in the direction of the electric field, so that the liquid crystal molecules are substantially coincident with the polymer network 5c in refractive index, thereby causing a transparent state. On the other hand, as illustrated in FIG. 2C, when the switch is off for applying no voltage to the pair of the transparent electrode substrates 5a from the power supply 10, the liquid crystal molecules are aligned along the surfaces of the polymer network 5c, so that the liquid crystal molecules are not coincident with the polymer network 5c in refractive index, thereby causing a light scattering state (non-transparent state). For example, in cases where the functional liquid crystal film 5 is formed to have a white color, if a voltage is applied to the functional liquid crystal film 5 having been white-clouded since no voltage has been applied thereto, the functional liquid crystal film 5 is made transparent. By utilizing this property of the functional liquid crystal film 5, it is possible to attain concealment with various color tones. As an actual example of the functional liquid crystal film 5, it is possible to employ a functional liquid crystal film manufactured by Kyushu Nanotec Optics Corporation.

The functional liquid crystal film 5 enables arbitrarily changing the degree of its transparency by changing the voltage applied thereto. Accordingly, by gradually increasing the voltage applied to the pair of the functional liquid crystal films 5 from the power supply 10 to a predetermined voltage (a voltage to be applied thereto), it is possible to cause a gradual changeover thereof from a non-transparent state to a transparent state. By causing such a gradual changeover thereof, it is possible to realize a state where the portion to be concealed, such as the display unit 1b or the camera unit, is gradually appearing. On the other hand, by abruptly increasing the voltage applied to the pair of the functional liquid crystal films 5 from the power supply 10 to the predetermined voltage, it is possible to cause an abrupt changeover thereof from a non-transparent state to a transparent state, thereby realizing a state where the portion to be concealed, such as the display unit 1b or the camera unit, is suddenly appearing.

The switch 11 for applying a voltage from the power supply 10 to the pair of the functional liquid crystal films 5 can be provided by utilizing, thereas, a switch to be operated when using the apparatus 1 or by utilizing, thereas, a contact switch (touch sensor) which automatically turns on if the apparatus 1 is touched.

The glossy layer 6 is placed by being attached to the back (the inner side) of the functional liquid crystal film 5 using an adhesive layer 15 made of a transparent adhesive agent. The glossy layer 6 preferably has at least the same size as that of the functional liquid crystal film 5. Further, the glossy layer 6 is a layer having both the function of reflecting light passing through the functional liquid crystal film 5 and the function of passing, therethrough, light passing through the functional liquid crystal film 5. The glossy layer 6 is preferably made of a non-conductive material which exerts no adverse influence on the functions of the touch sensor 4, the apparatus 1, and the like. The glossy layer 6 can be formed by printing and the like. As an example of the glossy layer 6, it is preferable to employ a layer capable of reflecting incident light through diffused reflection for exhibiting a metallic gloss without employing a metal at all and, also, capable of functioning as a concealing layer. As a result of employing the aforementioned structure, in cases where the apparatus 1 is a cellular-phone terminal, no functionally-adverse influences are exerted on radio waves for communication thereof or on sensors therein, since the glossy layer 6 is a non-metal film. This enables providing more enhanced concealment and also ensuring excellent designablility as will be described later, without degrading the performance of the apparatus 1. More specifically, as an example of the non-metal glossy layer having certain radio-wave transparency, there is a product with a trade name of "PICASUS" manufactured by Toray Corporation. A film with the trade name "PICASUS" is a metallic-tone nano laminated-layer PET film which is made of a non-metal and can be easily shaped. Employing such a nano multilayer-laminated structure forms a product which exhibits a gloss equivalent to those of metals and also has moldability, although it is made of a non-metal. More specifically, as illustrated in FIG. 3, pluralities (for example, several hundreds or several thousands) of transparent polymer layers 6a with a higher refractive index and transparent polymer layers 6b with a lower refractive index are alternately placed to form a nano multilayer-laminated structure (which is simply illustrated in FIG. 3 for ease of understanding), wherein each polymer layer 6a has a thickness of 0.2 micrometer or less, and the polymer layers 6b have a refractive index lower than that of the polymer layers 6a. Since incident light is reflected by the interfaces between the respective polymer layers 6a and 6b in this nano multilayer-laminated structure to cause a plurality of reflected lights, the nano multilayer-laminated structure exhibits a gloss and texture equivalent to those of metals although the structure is a non-metal. Further, the nano multilayer-laminated structure exhibits excellent moldability since the structure is formed from polymer layers. As an example of the present embodiment, it is preferable to employ a PET film having a nano multilayer-laminated structure with a transmittance of 20 to 30%. This is because if the transmittance is higher than 30%, the function of reflecting light is degraded, which may degrade the function of concealing the display unit 1b when the functional liquid crystal film 5 is at a non-transparent state. On the other hand, if the transmittance is lower than 20%, the function of passing light therethrough is degraded, which may degrade the viewability of the display unit 1b.

It is preferable to conform the color exhibited by the functional liquid crystal film 5 and the glossy layer 6 which are superimposed on one another to the color of the concealing layer 7 and the color of the casing 1a for integrating them, in view of enhancing the concealing property. With this configuration, it is possible to cause the functional liquid crystal film 5, that is, the area 1c where the display unit 1b is placed to be less prone to being easily distinguished from the casing 1a, thereby enabling concealing the area 1c where the display unit 1b is placed, when the apparatus 1 is not used, as will be described later. For example, in cases where the color exhibited by both the functional liquid crystal film 5 and the glossy layer 6 is not a stark white but a slightly-grayed color, it is preferable to conform the color of the sensor-wiring concealing layer 7 and the color of the casing 1a to this slightly-grayed color for integrating them.

Further, as illustrated in FIG. 1B and FIG. 1C, the concave portion 1g of the casing 1a is formed to be an insertion concave portion 1g with a quadrilateral-shaped planar surface, and its bottom portion is provided with a protruded portion 1h with a quadrilateral frame shape. The apparatus concealing film 2 is inserted in the insertion concave portion 1g and is supported by the protruded portion 1h, and the display unit 1b is placed inside the protruded portion 1h (thereunder in FIG. 1B and FIG. 1C). Accordingly, the protruded portion 1h is placed to be sandwiched between the apparatus concealing film 2 and the display unit 1b.

The apparatus concealing film 2 having the aforementioned structure is inserted in the concave portion 1g of the casing 1a of the apparatus 1 and is supported by the protruded portion 1h and, thereafter, the display unit 1b is placed inside the protruded portion 1h, so that the apparatus concealing film 2 is mounted in the concave portion 1g of the casing 1a of the apparatus 1, as illustrated in FIG. 1B and FIG. 1C. In this case, the outer surface of the transparent base member 3 as the outermost layer of the apparatus concealing film 2 can be either adapted to form the same plane as that of the outer surface 1j of the casing 1a of the apparatus 1 or adapted to form a slight level difference therebetween.

The display unit 1b is a device which is placed inside the glossy layer 6, namely the innermost layer of the apparatus concealing film 2, and also is adapted to display information necessary for use of the apparatus 1. The display unit 1b functions as an information output portion and can be constituted by any of display devices of various types, such as self-light-emission types, back-light types or side-illumination types. Other examples of the portion to be concealed of the apparatus 1 include designs desired to be concealed or a camera unit (an information input unit), instead of the display unit 1b.

Figure 4:
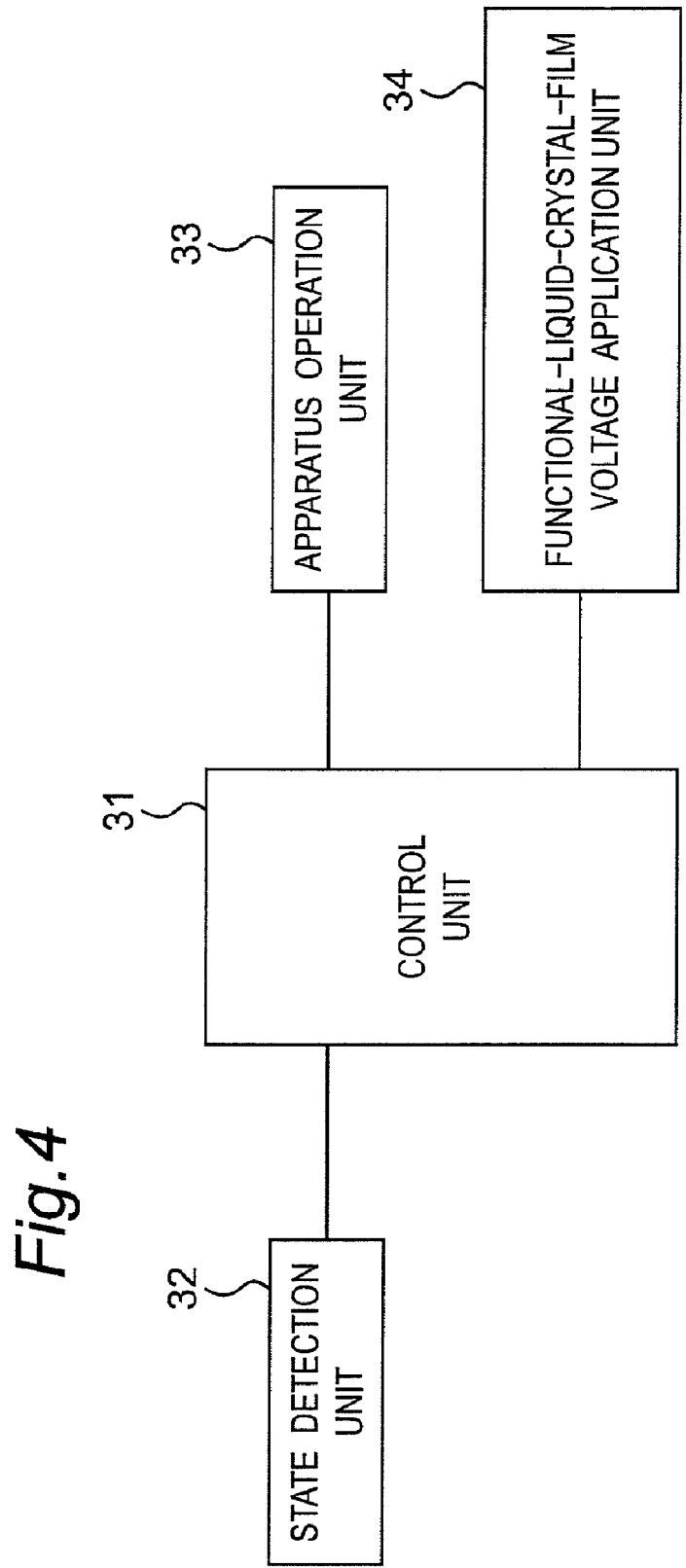
FIG. 4 is a functional block diagram of a control system which controls the function of concealing a display unit of a cellular-phone terminal as an exemplary apparatus to which the apparatus concealing film according to the embodiment is mounted and, also, the function of releasing the concealment thereof.

FIG. 4 is a functional block diagram of a control system which controls the function of concealing the display unit 1b of a cellular-phone terminal as an example of the apparatus 1 in FIG. 1b and also the function of releasing the concealment thereof. In this functional block diagram, the state detection unit 32, an apparatus operation unit 33, and a functional-liquid-crystal-film voltage application unit 34 are connected to a control unit 31.

The state detection unit 32 is adapted to detect a state where a user is using the apparatus 1 and can be constituted by, for example, the touch sensor 4 for the display unit 1b of the apparatus 1, a switch which is placed at a portion other than the display unit 1b of the apparatus 1 and is operated in using the apparatus 1, or a contact switch (a touch sensor) which is placed on the casing 1a of the apparatus 1 and is automatically turned on if the user touches the casing 1a.

If the state detection unit 32 detects a state where a user is using the apparatus 1, the control unit 31 performs control in such a way as to drive the apparatus operation unit 33 and also to drive the functional-liquid-crystal-film voltage application unit 34. If the state detection unit 32 detects a state where no user is using the apparatus 1, the apparatus operation unit 33 and the functional-liquid-crystal-film voltage application unit 34 are not driven.

The apparatus operation unit 33 is an operation unit which utilizes the apparatus 1 under the control of the control unit 31.

The functional-liquid-crystal-film voltage application unit 34 applies a voltage from the power supply to the functional liquid crystal film 5, under the control of the control unit 31. In the aforementioned description, for ease of understanding, applying or non-applying a voltage from the power supply 10 has been simply described as being performed by turning on or off the switch 11. In this case, the state detection unit 32 and the control unit 31 correspond to the switch 11.

The apparatus 1 including the apparatus concealing film 2 having the aforementioned structure operates as follows.

Figure 5A:
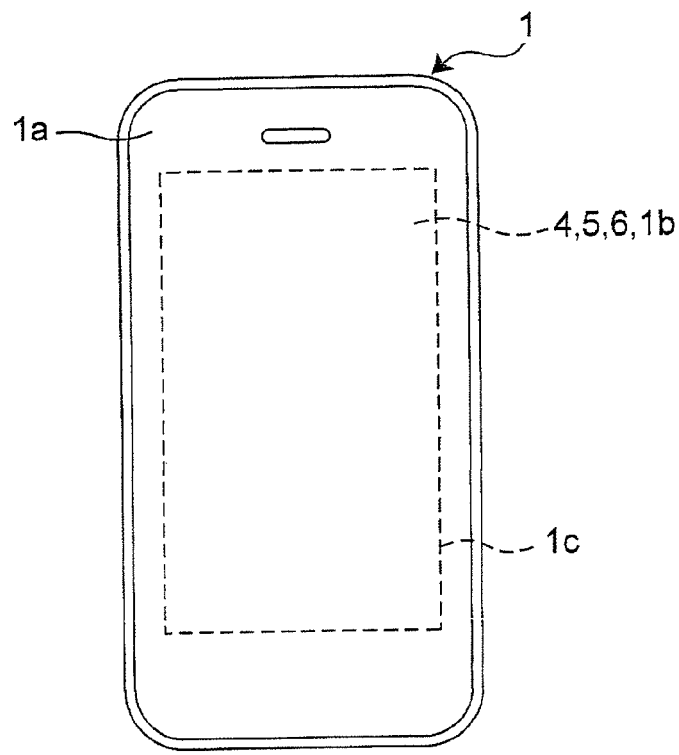
FIG. 5A is a plan view of a white-color cellular-phone terminal as an exemplary apparatus to which the apparatus concealing film according to the embodiment is mounted, at a state where the functional liquid crystal film is non-transparent, thereby preventing the area where the display unit exists from being perceived.
Figure 5B:
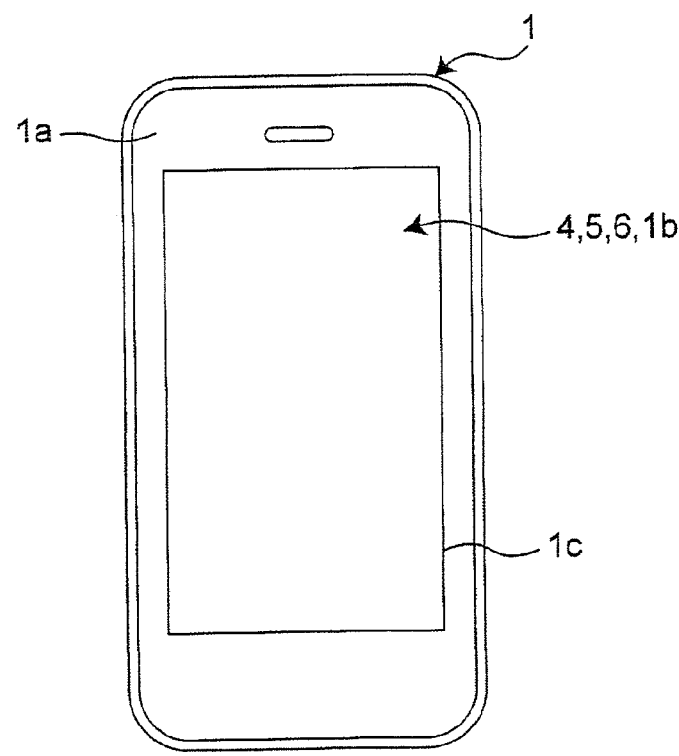
FIG. 5B is a plan view of the white-color cellular-phone terminal in FIG. 5A, at a state where the functional liquid crystal film is transparent, thereby manifesting the area where the display unit exists.

Referring to FIG. 5A and FIG. 5B, there will be described, as an example, a case where the apparatus 1 is a white-color cellular-phone terminal. In this apparatus 1, the outermost layer of the transparent substrate 3 forms a flat surface.

At first, when the apparatus 1 is not used, as illustrated in FIG. 2C, the switch 11 is off, and no voltage is applied to the transparent electrode substrates 5a in the functional liquid crystal film 5, and, therefore, the liquid crystal molecules align along the surfaces of the polymer network 5c, and the liquid crystal molecules are not coincident with the polymer network 5c in refractive index, thereby causing a light scattering state (non-transparent state), namely a white-clouded state. Accordingly, provided that the color exhibited by the touch sensor 4, the functional liquid crystal film 5, the glossy layer 6, and the display unit 1b when viewed from the outside is conformed to the color of the casing 1a, it is impossible to find the boundary therebetween. Namely, as illustrated in FIG. 5A, it is completely impossible to distinguish between the casing 1a and the area of the touch sensor 4, the functional liquid crystal film 5, the glossy layer 6, and the display unit 1b (the area where the display unit 1b exists) when they are viewed from the outside, thereby realizing a state where it is impossible to find the area where the display unit 1b exists. Further, in FIG. 5A, for ease of understanding, the area 1c where the display unit 1b exists is designated by a dotted line, but, in actual, there is nothing therein, thereby realizing a state where it is impossible to determine where the display unit 1b exists and even whether or not the display unit 1b itself exists.

Next, when the apparatus 1 is used, as illustrated in FIG. 2B, the switch 11 is on, and a voltage is applied to the transparent electrode substrates 5a in the functional liquid crystal film 5, so that the liquid crystal molecules are oriented in the direction of the electric field, and the liquid crystal molecules are substantially coincident with the polymer network 5c in refractive index, thereby realizing a transparent state. This causes a state where it is possible to clearly find the boundary between the casing 1a and the area 1c of the touch sensor 4, the functional liquid crystal film 5, the glossy layer 6, and the display unit 1b when they are viewed from the outside. Namely, as illustrated in FIG. 5B, it is possible to clearly distinguish between the casing 1a and the area 1c where the display unit 1b exists (the area 1c of the touch sensor 4, the functional liquid crystal film 5, the glossy layer 6, and the display unit 1b when viewed from the outside), which makes it possible to clearly and visually recognize the existence of the display unit 1b and the display thereon.

Further, with reference to FIGS. 6A to 6C, as another example, there will be described a case where the apparatus 1 is a white-color cellular-phone terminal and, also, the apparatus 1 includes a transparent substrate 3 having an outermost layer having a three-dimensional curved surface.

At first, when the apparatus 1 is not used, as illustrated in FIG. 2C, the switch 11 is off, and no voltage is applied to the transparent electrode substrates 5a in the functional liquid crystal film 5, and, therefore, the liquid crystal molecules align along the surfaces of the polymer network 5c, and the liquid crystal molecules are not coincident with the polymer network 5c in refractive index, thereby causing a light scattering state (non-transparent state), namely a white-clouded state. Accordingly, provided that the color exhibited by the touch sensor 4, the functional liquid crystal film 5, the glossy layer 6, and the display unit 1b when viewed from the outside is conformed to the color of the casing 1a, it is impossible to find the boundary therebetween. Namely, as illustrated in FIG. 6A, the casing 1a and the area of the touch sensor 4, the functional liquid crystal film 5, the glossy layer 6, and the display unit 1b (the area where the display unit 1b exists) when viewed from the outside are at a state where nothing exists on the surface of the terminal apparatus 1 in actual, which makes it impossible to determine where the display unit 1b exists and also even whether or not the display unit 1b itself exists.

Next, when the apparatus 1 is used, as illustrated in FIG. 2B, the switch 11 is on, and a voltage is applied to the transparent electrode substrates 5a in the functional liquid crystal film 5, so that the liquid crystal molecules are oriented in the direction of the electric field, and the liquid crystal molecules are substantially coincident with the polymer network 5c in refractive index, thereby realizing a transparent state. Accordingly, the area 1c of the touch sensor 4, the functional liquid crystal film 5, the glossy layer 6, and the display unit 1b when viewed from the outside are at a state where the boundary between this area 1c and the casing 1a can be clearly recognized. Namely, as illustrated in FIGS. 6B to 6C, a transition occurs from the state where the area 1c where the display unit 1b exists (the area 1c of the touch sensor 4, the functional liquid crystal film 5, the glossy layer 6, and the display unit 1b when viewed from the outside) can be gradually distinguished from the casing 1a to a state where they can be clearly distinguished from each other. In the state of FIG. 6C where the apparatus 1 is used, it is possible to clearly and visually recognize the existence of the display unit 1b and the display thereon. Further, in FIG. 6C, a reference character "1e" designates ten keys "1" to "9" being displayed on the display unit 1b in the cellular-phone terminal, and "1f" designates functional keys being displayed on the display unit 1b. The respective keys 1e and 1f are structured such that switches in the touch sensor 4 are turned on by pushing the positions of the respective keys 1e and 1f with fingers and the like.

Therefore, according to the present embodiment, the glossy layer 6 is placed between the display unit 1b and the functional liquid crystal film 5 and, therefore, the glossy layer 6 can enhance the concealing ability, which has been insufficiently provided by only the functional liquid crystal film 5. This can augment the concealing ability of the functional liquid crystal film 5. Further, by forming the glossy layer 6 from a non-metal, it is possible to prevent the occurrence of radio-wave disturbances and the like. This enables provision of an apparatus concealing film capable of realizing a necessary concealing ability for designs of various types of products without inducing radio-wave disturbances and the like, an apparatus employing the same, and a method for concealing a portion to be concealed of an apparatus.

Further, the color exhibited by the functional liquid crystal film 5 at the electrically-nontransparent state, the glossy layer 6, and the display unit 1b when they are viewed from the outside through the transparent base member 3 is conformed to the color exhibited by the casing 1a for integrating them. With this structure, when the apparatus 1 is not used, and the functional liquid crystal film 5 is at a non-transparent state, the display unit 1b is integrated with the casing 1a, which makes it impossible to distinguish therebetween, thereby realizing a design capable of substantially eliminating the existence of the display unit 1b itself (in other words, substantially-completely concealing the display unit 1b). On the other hand, when the apparatus 1 is used, and the functional liquid crystal film 5 is at a transparent state, the display unit 1b can be made to be clearly distinguished from the casing 1a, thereby improving the viewability of the display unit 1b.

Accordingly, by applying the present embodiment having the aforementioned structure to an apparatus 1, for example, portable apparatus such as a cellular-phone terminal, it is possible to cause a transition of the display unit 1b from a state where the display unit 1b is substantially-completely concealed and, therefore, the existence of the display unit 1b itself can not be perceived at all to a state where the display unit 1b is manifested, which can provide an impressive design with surprising and unpredictable quality of a type for users. For example, it is possible to provide a design capable of suddenly manifesting a display unit 1b at a portion which has not been expected to have the display unit 1b at all, such as in a refrigerator door. On the contrary, it is possible to design a design capable of causing a transition of a display unit 1b in a portable apparatus and the like, from a state where the display unit 1b exists naturally as a portable apparatus and the like (a state of a conventional portable apparatus) to a state where the display unit 1b can not be perceived at all at first glance. As a result, it is possible to largely increase the degree of flexibility in designing designs.

Further, for example, it is possible to cause a transition of a display unit 1b from a non-used state to a used state, which causes the display unit 1b to appear gradually or abruptly, thereby causing this apparatus to be perceived as an electronic apparatus such as a portable apparatus, if a user touches an object having a simple box shape or an egg shape to cause a touch sensor provided on the object to respond thereto.

As described above, it is possible to provide significantly-impressive and effective designs which have not been realized in the conventional art, for the casings 1a of apparatuses 1 such as portable apparatuses. This is applicable to concealment of display units 1b of, for example, televisions, home electric appliances such as domestic refrigerators, door phones, and the like, as well as to the casings of portable apparatuses.

On the other hand, with conventional concealing techniques, it has been possible to perform only concealment at states where the existence of display units can be ambiguously recognized, which has resulted in insufficiently-impressive designs with no unpredictable quality. This is because, even in cases of using a functional liquid crystal film, the functional liquid crystal film has been merely placed on a display unit and, therefore, the color exhibited by the combination of the functional liquid crystal film and the display unit at non-used states has been capable of providing a poor ability of concealing the display unit and, also, incapable of being conformed to the color of the casing 1a, which has made it impossible to substantially-completely conceal the display unit. Further, as described above, metal vapor deposition has exerted large influences on electronic apparatuses and, furthermore, there have been concerns about adverse influences of other methods on functional liquid crystal films under high temperatures or high pressures. For example, on the assumption that a glossy layer constituted by a layer formed by metal vapor deposition is transferred to a functional liquid crystal film, there is a high possibility that the transferring pressure and temperature exert adverse influences on ITO layers in the liquid crystal film and the adhesive layers for adhering them to one another. Accordingly, the realization thereof is considered to be difficult.

On the contrary, in the present embodiment, the glossy layer 6 is placed between the display unit 1b and the functional liquid crystal film 5, so that the glossy layer 6 enhances the concealing function, which has been insufficient in the conventional art. Further, the color exhibited by the combination of the display unit 1b, the glossy layer 6, and the functional liquid crystal film 5 can be conformed to the color of the casing 1a at a non-used state, which enables substantially-completely concealing the display unit 1b. Further, by forming the glossy layer 6 from a non-metal (for example, by forming the glossy layer 6 from a non-metal glossy film), it is possible to realize ideal concealment, without inducing the aforementioned issues with the combination of the glossy layer 6 and the functional liquid crystal film 5.

Figure 6A:
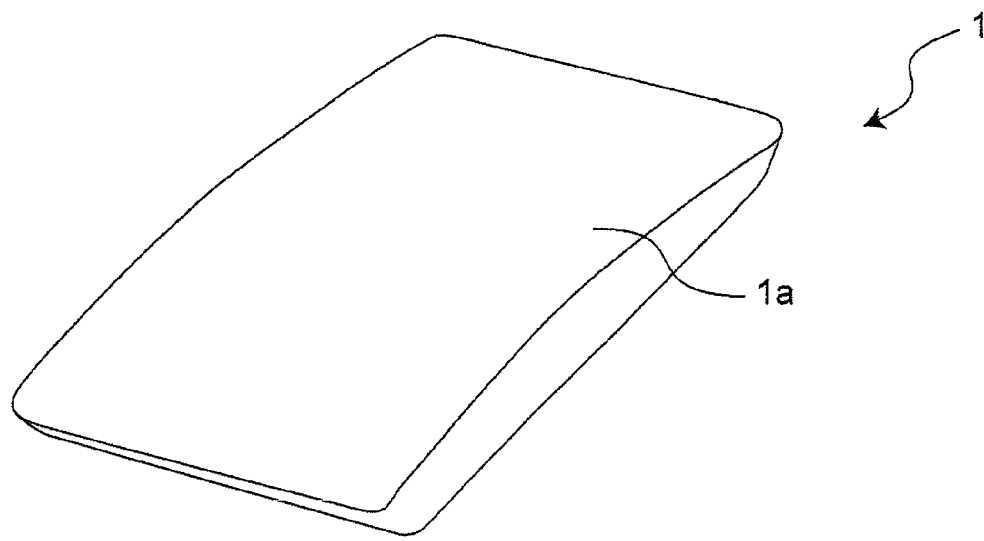
FIG. 6A is a perspective view of another white-color cellular-phone terminal as an exemplary apparatus to which the apparatus concealing film according to the embodiment is mounted, at a state where the functional liquid crystal film is non-transparent, thereby preventing the area where the display unit exists from being perceived.
Figure 6B:
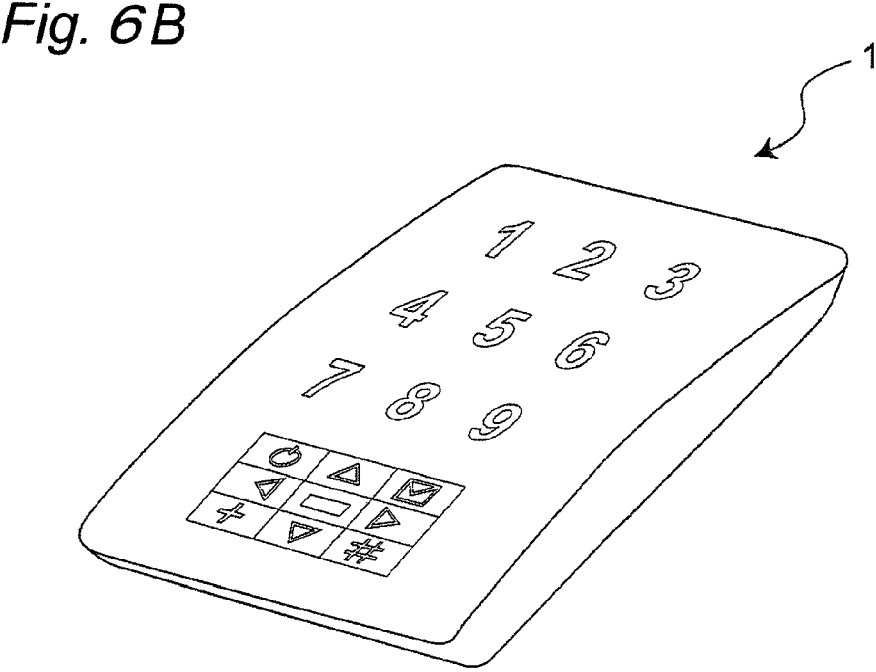
FIG. 6B is a perspective view of the white-color cellular-phone terminal in FIG. 6A, at a state where the functional liquid crystal film is transparent, thereby gradually manifesting the area where the display unit exists.
Figure 6C:
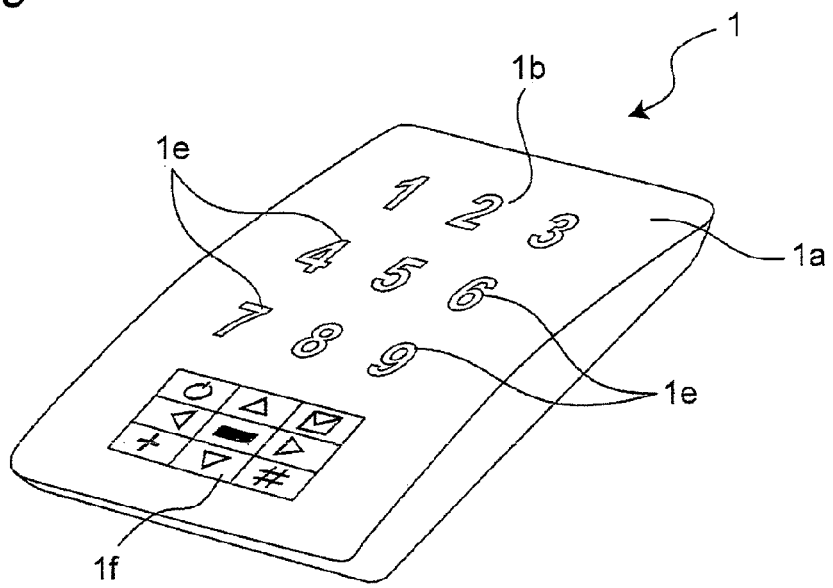
FIG. 6C is a plan view of the white-color cellular-phone terminal in FIG. 6A, at a state where the functional liquid crystal film is transparent, thereby manifesting the area where the display unit exists.

Further, by controlling the voltage applied to the functional liquid crystal film 5, it is possible to arbitrarily design the design change, such as designs capable of causing an abrupt transition from a state where the existence of a display unit 1b is eliminated as in FIG. 5A and FIG. 6A to a state where the display unit 1b clearly exists as in FIG. 5B and FIG. 6C or designs capable of causing a transition from a state where the existence of a display unit 1b is eliminated as in FIG. 6A to a state where the display unit 1b clearly exists as in FIG. 6C through a state where the display unit 1b is ambiguously appearing as in FIG. 6B (a state where the content of the display unit 1*b* is ambiguous and unclear, in actual, although the content of the display unit 1*b* is designated by a narrow line for clarification of illustration in FIG. 6B).

Figure 7A:
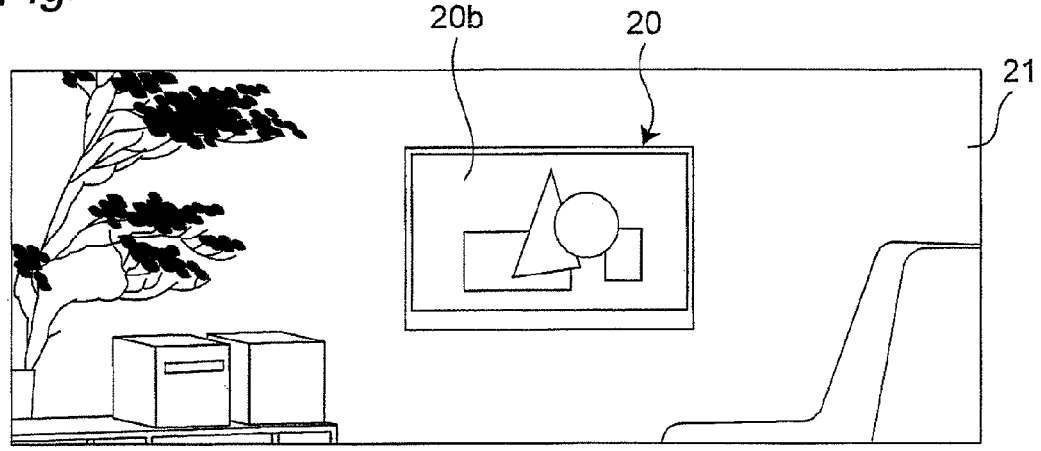
FIG. 7A is an explanatory view of a display unit of a television mounted on a white-color wall, as an another exemplary apparatus to which the apparatus concealing film according to the embodiment is mounted, at a state where the functional liquid crystal film is transparent, thereby manifesting the area where the display unit exists.
Figure 7B:
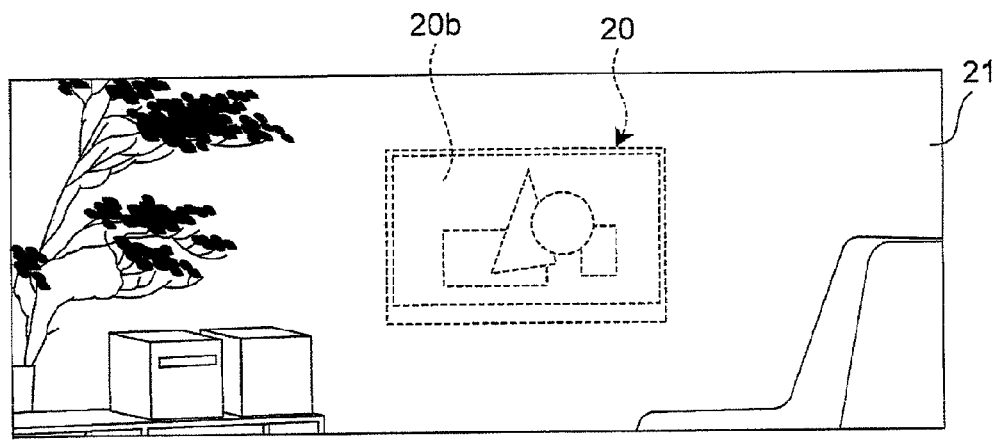
FIG. 7B is an explanatory view of the display unit of the television in FIG. 7A, at a state where the functional liquid crystal film is transparent, and the area where the display unit exists is being gradually concealed.
Figure 7C:
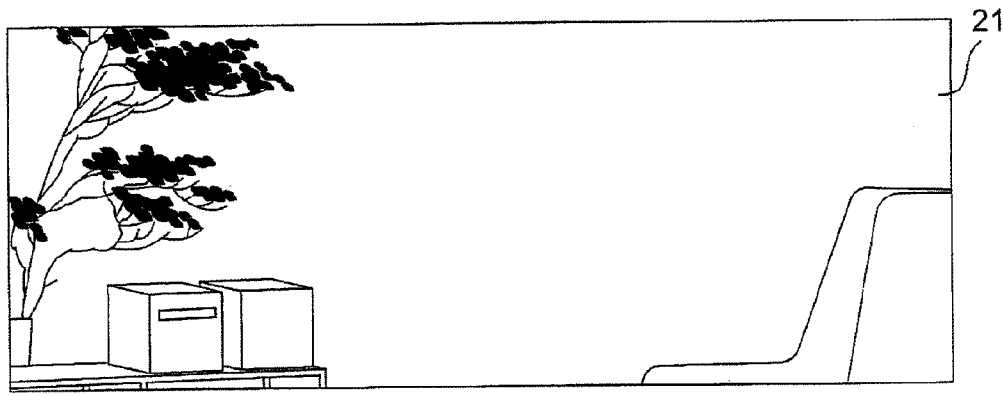
FIG. 7C is an explanatory view of the display unit of the television in FIG. 7A, at a state where the functional liquid crystal film is non-transparent, thereby preventing the area where the display unit exists from being perceived.

Further, the object to which the present invention is applied is not limited to a portable apparatus, and the present invention can be applied to a display unit 20*b* in a television 20 which is fitted in a wall 21 in a home, for example. In this case, as illustrated in FIG. 7A, the display unit 20*b* exists in the white wall 21 so as to be manifested, at a used (switch-on) state. A transition of the display unit 20*b* occurs from this state where the display unit 20*b* is manifested to a stark-white state (a solid and plain state) where the display unit 20*b* seems as if the display unit 20*b* did not exist in the wall 21 as illustrated in FIG. 7C, through a state where the existence of the display unit 20*b* ambiguously appears as illustrated in FIG. 7B (a state where the content of the display unit 20*b* is ambiguous and unclear, in actual, although the content of the display unit 20*b* is designated by a narrow dotted line for clarification of illustration in FIG. 7B). Accordingly, it is possible to provide a design capable of causing the display unit 20*b* to suddenly or gradually appear for manifesting the display unit 20*b*, at a portion of the wall 21 which has been considered to be a solid wall having nothing.

Further, the color of the concealment, such as the casing 1, is not limited to a white color, and it is possible to employ any color capable of being realized by dyeing with dyestuffs, such as mazarine colors or black colors.

Figure 1D:
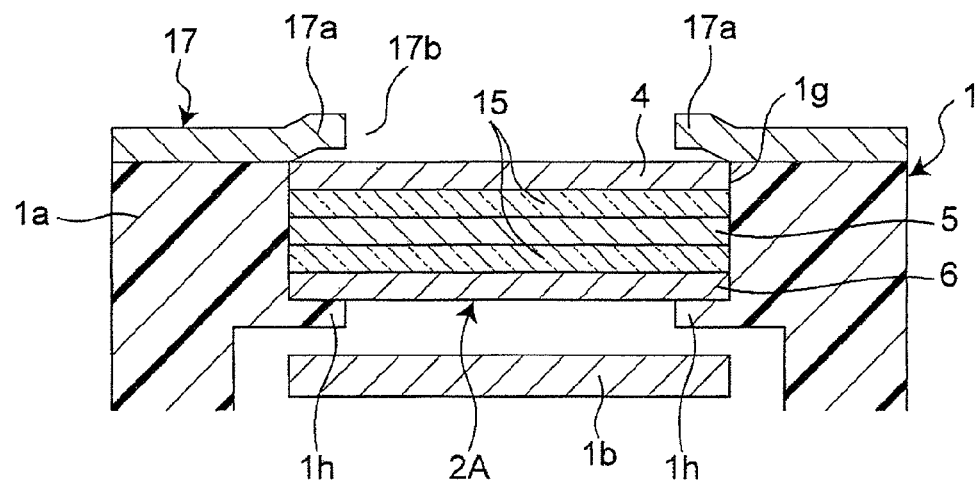
FIG. 1D is a cross-sectional view of the apparatus concealing film at a state where the film is mounted to the casing of the apparatus, according to a modification of the embodiment, clearly illustrating adhesive layers therein.

Further, in the embodiment, it is also possible to eliminate the transparent base member 3 and the concealing layer 7. Namely, for example, in a modification illustrated in FIG. 1D, the transparent base member 3 and the concealing layer 7 are eliminated, an apparatus concealing film 2A having a touch sensor 4, a functional liquid crystal film 5, and a glossy layer 6 is inserted in an insertion concave portion 1*g* of a casing 1*a* and is supported by a protruded portion 1*h* and, thereafter, for example, a plate-shaped engagement member 17 made of a synthetic resin is placed on the outer surface of the casing 1*a*. The engagement member 17 has an opening 17*b* smaller than the insertion concave portion 1*g* at a portion corresponding to the insertion concave portion 1*g*, and the opening 17*b* has, at its edge portion, a bezel 17*a* which is engaged with the peripheral edge portion of the touch sensor 4 for preventing the disengagement of the apparatus concealing film 2A from the insertion concave portion 1*g*.

Further, by properly combining the arbitrary embodiments of the aforementioned various embodiments, the effects possessed by the embodiments can be produced.

The apparatus concealing member, the apparatus employing the same, and the method for concealing a portion to be concealed of an apparatus according to the present invention are advantageous, since the apparatus concealing member can be mounted to a portion to be concealed such as a display unit in an apparatus to add, thereto, a specific design capable of concealing the portion to be concealed in a concealment mode while manifesting the portion to be concealed in a non-concealment mode. As concrete examples of the apparatus, it is possible to exemplify apparatuses as follows. Namely, it is possible to exemplify portable apparatuses and televisions (including monitors of personal computers, which merely seem like synthetic-resin panel plates at non-used states, for example), home electric appliances provided with liquid crystal display devices (such as refrigerators' doors, door phones, digital photo stands, rice cookers, ovens, microwave ovens, air-cleaning devices, air conditioners, remote controllers, clocks), vacuum cleaners (such as filter portions of cyclone-type vacuum cleaners), various types of tanks attached to home electric appliances (such as clothes irons, dehumidifiers, humidifiers), illumination apparatuses, furnishings, credit cards (which seem to be solid when they are not used, for example), container boxes or furniture (such as container boxes or furniture having doors which are made see-through for facilitating the grasp of the contents therein at used states), car-mounted display panels (which seem to be solid when not used), coin banks, mirrors, white boards, desk pads, and the like.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

The invention claimed is:

1. An apparatus concealing film which is mountable to a casing of an apparatus so as to be able to cover a portion to be concealed of the apparatus and is capable of concealing the portion to be concealed of the apparatus in a concealment mode while manifesting the portion to be concealed in a non-concealment mode, the apparatus concealing film comprising: a film-type information input device; a functional liquid crystal film which is placed under the information input device, also can be placed at a position where the functional liquid crystal film covers the portion to be concealed of the apparatus and can be electrically changed over between being transparent and being non-transparent; and a film-type non-metal glossy layer which is placed under the functional liquid crystal film and, also, exhibits transparency and a gloss due to reflection; wherein the information input device, the functional liquid crystal film, and the glossy layer are laminated in the mentioned order; a film-type transparent base member placed on the information input device, and a concealing layer for concealing wiring of the information input device, which is placed on an inner surface of the transparent base member at a periphery of the information input device, wherein a color exhibited by the functional liquid crystal film at an electrically-nontransparent state, the glossy layer, and the portion to be concealed when viewed from outside of the apparatus through the transparent base member is conformed to a color of the concealing layer and a color of the casing to which the apparatus concealing film is mounted.

2. The apparatus concealing film according to claim 1, wherein a color exhibited by the functional liquid crystal film at an electrically-nontransparent state, the glossy layer, and the portion to be concealed when viewed from outside of the apparatus through the information input device is conformed to a color of the casing to which the apparatus concealing film is mounted.

3. The apparatus concealing film according to claim 1, wherein the functional liquid crystal film is formed from a polymer-dispersed type liquid crystal film and is structured to be changed over between a light-transparent state and a non-transparent state where light does not pass therethrough by application of a voltage thereto.

4. An apparatus concealing film which is mountable to a casing of an apparatus so as to be able to cover a portion to be concealed of the apparatus and is capable of concealing the portion to be concealed of the apparatus in a concealment mode while manifesting the portion to be concealed in a non-concealment mode, the apparatus concealing film comprising: a film-type information input device; a functional liquid crystal film which is placed under the information input device, also can be placed at a position where the functional liquid crystal film covers the portion to be concealed of the apparatus and can be electrically changed over between being transparent and being non-transparent; and a film-type non-metal glossy layer which is placed under the functional liquid crystal film and, also, exhibits transparency and a gloss due to reflection; wherein the information input device, the functional liquid crystal film, and the glossy layer are laminated in the mentioned order; a state detection unit adapted to detect the usage state of the apparatus; a functional-liquid-crystal-film voltage application unit adapted to apply a voltage to the functional liquid crystal film in the apparatus concealing film; and a control unit adapted to control the functional-liquid-crystal-film voltage application unit, such that the functional-liquid-crystal-film voltage application unit applies the voltage to the functional liquid crystal film when the state detection unit detects the usage state of the apparatus and, also, such that the functional-liquid-crystal-film voltage application unit does not apply the voltage to the functional liquid crystal film when the state detection unit does not detect the usage state of the apparatus.

5. The apparatus according to claim 4, wherein the portion to be concealed is a display unit in the apparatus.

6. An apparatus concealing film which is mountable to a casing of an apparatus so as to be able to cover a portion to be concealed of the apparatus and is capable of concealing the portion to be concealed of the apparatus in a concealment mode while manifesting the portion to be concealed in a non-concealment mode, the apparatus concealing film comprising: a film-type information input device; a functional liquid crystal film which is placed under the information input device, also can be placed at a position where the functional liquid crystal film covers the portion to be concealed of the apparatus and can be electrically changed over between being transparent and being non-transparent; and a film-type non-metal glossy layer which is placed under the functional liquid crystal film and, also, exhibits transparency and a gloss due to reflection; wherein the information input device, the functional liquid crystal film, and the glossy layer are laminated in the mentioned order; the apparatus concealing film mounted to the casing of the apparatus; a state detection unit adapted to detect the usage state of the apparatus; a functional-liquid-crystal-film voltage application unit adapted to apply a voltage to the functional liquid crystal film in the apparatus concealing film; and a control unit adapted to control the functional-liquid-crystal-film voltage application unit, such that the functional-liquid-crystal-film voltage application unit applies the voltage to the functional liquid crystal film when the state detection unit detects the usage state of the apparatus and, also, such that the functional-liquid-crystal-film voltage application unit does not apply the voltage to the functional liquid crystal film when the state detection unit does not detect the usage state of the apparatus, the method comprising: detecting the usage state of the apparatus by the state detection unit; controlling the functional-liquid-crystal-film voltage application unit by the control unit such that the functional-liquid-crystal film voltage application unit applies a voltage to the functional liquid crystal film in the apparatus concealing film for changing over the functional liquid crystal film from a non-transparent state to a transparent state for manifesting the portion to be concealed, when the usage state of the apparatus is detected by the state detection unit; and controlling the functional-liquid-crystal-film voltage application unit by the control unit such that the functional-liquid-crystal film voltage application unit does not apply the voltage to the functional liquid crystal film in the apparatus concealing film for changing over the functional liquid crystal film from the transparent state to the non-transparent state for concealing the portion to be concealed, when the usage state of the apparatus is not detected by the state detection unit.

* * * * *